Feb. 18, 1969  F. L. SWILLINGER  3,428,444
APPARATUS FOR MINIMIZING OPEN BOTTOM BLISTERS ON FLOAT GLASS
Filed Feb. 21, 1966

INVENTOR.
Francis L. Swillinger
BY
Nobbe & Swope
ATTORNEYS

United States Patent Office 3,428,444
Patented Feb. 18, 1969

3,428,444
APPARATUS FOR MINIMIZING OPEN BOTTOM BLISTERS ON FLOAT GLASS
Francis L. Swillinger, Modesto, Calif., assignor to Libbey-Owens-Ford Glass Company, Toledo, Ohio, a corporation of Ohio
Filed Feb. 21, 1966, Ser. No. 528,890
U.S. Cl. 65—182                                             7 Claims
Int. Cl. C03b 5/00

ABSTRACT OF THE DISCLOSURE

Apparatus for producing float glass wherein a bath of molten metal is maintained in a tank having walls of refractory material and a solid casing outside of the walls. A chamber connected to a vacuum source is secured to the exterior of the casing over an opening therein, and a layer of porous material is positioned between the chamber and refractory wall over the opening.

---

The present invention relates broadly to the production of flat glass by the so-called float process and more particularly to improved apparatus for minimizing, if not entirely eliminating, the formation of defects known as open bottom blisters during the production of a continuous ribbon by this procedure.

As explained in U.S. Patent 3,083,551, issued Apr. 2, 1963, in practicing the float process, glass (either in ribbon form or in the molten state) is delivered at a controlled rate onto a bath of molten metal such as tin and is advanced along the surface of the metal bath under thermal and mechanical conditions which assure (1) that a floating body of molten glass that is free to flow laterally is established on the molten metal, and (2) that from this molten glass body there will develop on the surface of the metal bath a buoyant layer of molten glass of stable thickness. As this layer of stable thickness develops it is supported on and continuously advanced in ribbon form over the surface of the molten metal bath and sufficiently cooled as it advances to permit it to be finally removed unharmed from the molten metal.

As also explained in U.S. Patent 3,083,551, the thickness of the ultimate ribbon may be the equilibrium thickness of the glass in the molten layer or the thickness of the ultimate ribbon may be modified by increasing the speed of the conveying means used to remove the ribbon from the molten metal bath, thus attenuating the glass layer of stable thickness as it advances to produce an ultimate ribbon of less thickness than the equilibrium thickness of the glass. Similarly, by restricting the lateral flow of the molten glass in the floating body a glass layer and an ultimate ribbon of greater than the equilibrium thickness can be achieved.

In any event, in creating the buoyant layer and as it achieves its ultimate thickness, distortion disappears and the layer of glass, which has assumed level formation on the molten metal bath, develops as a continuous ribbon of uniform thickness, free of distortion and having a fire finish. This is the potential advantage of the "float" process.

However, in actual commercial production, considerable difficulty has been encountered from unexplained presence of bubbles that rise upwardly through the molten metal bath and which, when they reach the lower surface of the glass layer or ribbon on the bath, form what may be described as open-bottom blisters in the ribbon.

These bubbles may occur at a number of locations in the bath but to date have been most troublesome in a relatively restricted area in the vicinity of the forward wall of the container for the molten metal. Their cause and source is not definitely known and their number may vary, with different installations and with different refractories in the container, from a few to some thousands of bubbles per hour. In any considerable number they present a serious problem in the relatively new art of making "float" glass.

However, it has recently been found that, when the casing in which the refractory walls of the container for the bath of molten metal is conventionally enclosed, and particularly when the bottom of the casing, is provided with properly located openings and gas is positively withdrawn therethrough, the bubble condition in the molten metal bath will be either entirely eliminated or reduced to a point where it has no seriously detrimental effect on the quality of the float glass being produced.

It is a primary object of this invention to improve the quality of float glass by eliminating upwardly rising bubbles from the bath of molten metal upon which the glass floats.

Another object is to provide a special suction device for association with the casing surrounding the container for the molten metal bath for releasing pressure within said casing by withdrawing gas therefrom.

Further objects and advantages of the invention will become more apparent during the course of the following description when taken in connection with the accompanying drawings.

In the drawings, wherein like numerals are employed to designate like parts throughout the same:

Figure 1:
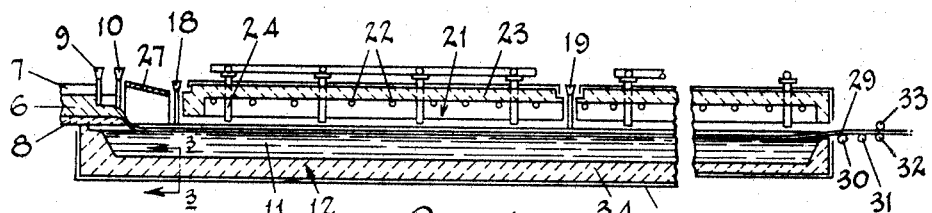
FIG. 1 is a central, longitudinal, vertical, sectional view through a typical form of float glass apparatus.
Figure 2:
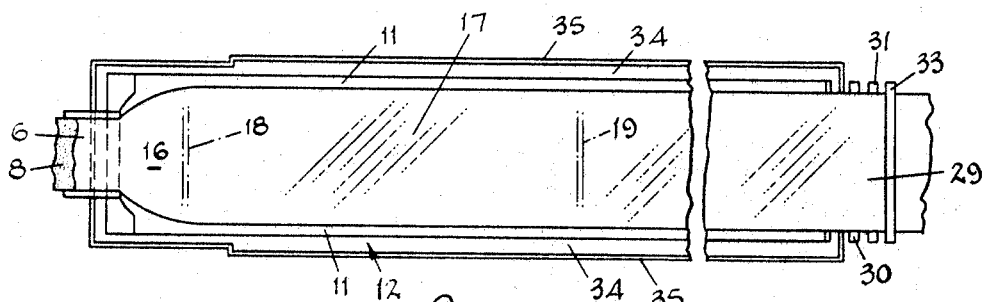
FIG. 2 is a plan view of the apparatus of FIG. 1 with the superstructure removed.

Referring now more particularly to the drawings, there has been illustrated in FIGS. 1 and 2 a typical float glass apparatus similar to one disclosed in U.S. Patent No. 3,083,551.

As there shown, glass 6 in molten form is supplied from a forehearth 7 to a spout lip 8, with the flow of molten glass from the spout lip being controlled by a tweel 9 and a gate 10.

On leaving the spout 8 the glass forms a buoyant molten body indicated at 16, on the metal bath 11 contained in a tank 12, and a buoyant layer of stable thickness 17 is developed therefrom by the maintenance of a temperature of 1000° C. or more in that part of the bath between tweels 18 and 19.

The headspace 21 over the bath is preferably heated by radiant heat directed downwardly from heaters 22 and this headspace or chamber, which contains the "float atmosphere," is enclosed by a roof structure 23 which, with extension 27, makes it possible to maintain a sufficient volume of protecting gas over that part of the metal bath 11 that is exposed at each side of the molten glass in the chamber. This roof structure 23 is provided at intervals with ducting 24 through which protecting gas is fed into the headspace 21 at a rate to create a plenum therein. The protecting gas is one which will not chemically react with tin to produce contaminants of the glass such as tin oxide or tin sulphide and by providing a plenum ingress to the headspace 21 entrance of atmospheric air is prevented.

To remove the ultimate ribbon 29 from the molten metal bath, there is mounted, outside of the discharge end of the tank, mechanical receiving and conveying means exemplified by supporting rollers 30 to 32 and superimposed roller 33. Any or all of the rollers 30 to 33 may be driven and cooperate to apply a tractive effort to the ribbon of glass moving towards the outlet, which tractive effort also assists in advancing the glass along the bath and may be increased to attenuate the ribbon when a thickness less than the equilibrium thickness of the glass is desired.

As indicated above it is conventional in containers or tanks for molten metal to employ refractory walls (shown at 34 in FIGS. 1 and 2) and to enclose or cover these walls with a solid casing 35 to prevent leakage of the molten metal through joints between, or through cracks or fissures in, the refractory blocks from which the walls of the container are made.

This is particularly true in the case of the tanks for the molten metal bath in float glass apparatus because the metal most commonly used in the bath is tin, which has a very high fluidity and low melting point; and because of the importance of keeping the "float atmosphere" in and air out of such apparatus.

Figure 3:
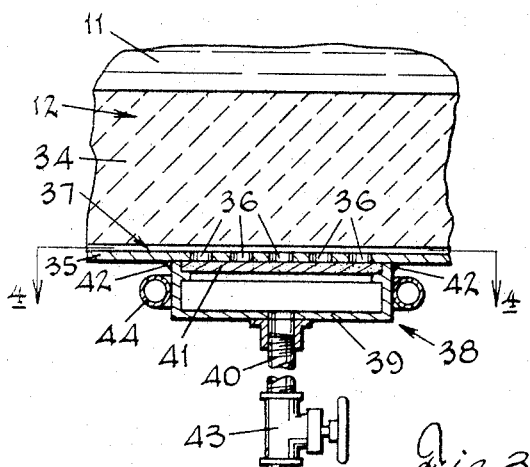
FIG. 3 is a fragmentary, vertical, sectional view taken substantially along the line 3—3 in FIG. 1 and showing a preferred form of the pressure relieving means of the invention.

According to the present invention objectionable bubbles rising through the tin bath can be stopped or prevented by releasing pressure that appears to buildup within the casing 35 of the tank 12 in the operation of a conventional float glass apparatus; first, by providing openings in the casing, and preferably in the bottom walls, as shown at 36 in FIG. 3, in the areas where bubbles do or may be expected to occur. Such openings may communicate with surrounding areas within the casing directly or through a space or spaces, as shown at 37, between the casing and the refractory blocks. As many openings may be provided as are necessary to relieve the pressure within the casing to a point where upwardly rising bubbles will not appear in the molten bath. Any pattern of openings may be used but, since the bubbles most often occur in relatively restricted areas, it is generally desirable to employ a pattern of openings 36 that substantially conforms in size and shape with a suspected or infested area.

Secondly, the invention contemplates a special means for positively releasing or reducing pressure within a casing and a preferred form of apparatus which may be used to accomplish this is illustrated in FIG. 3 of the drawings. As there shown there is mounted in registry with a pattern or line of release openings 36 in the casing 35 a suction device 38 which includes an upwardly opening chamber or hollow body portion 39 connected to a pipe 40 leading to a vacuum pump (not shown).

The open side or top of the chamber 39 is closed by means of a porous wall or lid 41 and the complete suction device 38 is secured and sealed to the casing 35 in surrounding relation to the openings 36 in any suitable manner as indicated at 42. With the device 38 in place, gas can be exhausted from the interior of the casing 35 and from the refractory walls 34 by simply operating the vacuum pump to which the pipe 40 is connected or by opening a suitable valve in the vacuum line such as shown at 43.

Figure 4:
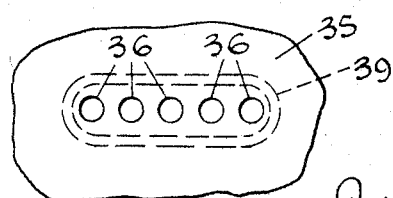
FIG. 4 is a fragmentary sectional view taken substantially along the line 4—4 in FIG. 3.

The chamber 39 may be oval as shown in FIG. 4 so as to surround a plurality of openings 36 arranged in a line as shown in FIG. 4 or in some other elongated pattern; or it may be of any other desired shape and size that may be required to surround a smaller or larger number of openings arranged in any desired pattern. The wall 41 between the chamber 39 and the refractory blocks 34 may be of porous metal and closes the openings 36 to molten tin tending to leak from the casing 35 while, at the same time, permitting gas to be freely exhausted by suction. To further aid in preventing possible escape of the molten tin an air cooled ring or the like 44 may be provided around the chamber 39 adjacent the seal 42.

The type of suction device just described is adapted to practically any situation including one where it is necessary to exhaust gas from an area of the bath casing of an existing float glass apparatus which requires the drilling of new openings 36; for example where bubbles have occurred for the first time or at a different location in a tank.

Figure 5:
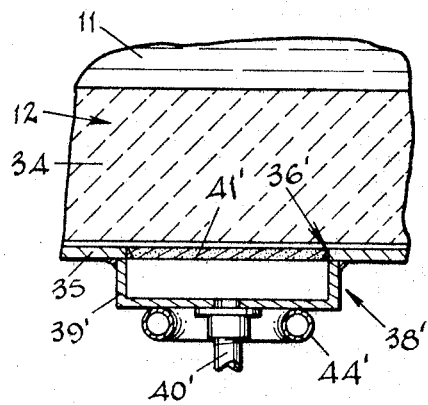
FIG. 5 is a view similar to FIG. 3 but showing a modified form of suction device.

On the other hand, where a new float apparatus is being installed or an old one rebuilt it may be desired to install in strategic or suspected areas the modified form of suction device shown at 38' in FIG. 5. As will be seen this is similar in structure and operation to the device of FIG. 3 except that a porous metal plate or wall 41' is inserted into and so fills as well as closes a vent area 36' here shown as a single opening but which may be a pattern of openings with a porous insert in each. Also in this case the air cooling ring 44' may be located against the closed side or bottom of the chamber 39' and in surrounding relation to the vacuum line or pipe 40' of the device.

The amount of vacuum employed with an apparatus such as shown in FIGS. 3 to 5 will of course be dependent on the number of bubbles it is necessary to control, the number of release openings connected to the vacuum pump and on other conditions peculiar to the particular float apparatus.

By way of example only it can be stated that in one specific installation an apparatus such as shown in FIG. 3 was utilized and when the valve 43 was completely closed to shut off the pull of the vacuum pump on the release openings 36 a buildup of pressure was recorded within the casing 35. The subsequent application to the release openings 36 of a vacuum somewhat greater in degree than the recorded pressure was found adequate to control bubble formation in the molten metal.

It is of course to be understood that the forms of the invention herewith shown and described are to be taken as illustrative embodiments only of the same, and that various changes in the shape, size and arrangement of parts may be resorted to without departing from the spirit of the invention.

I claim:

1. In apparatus for producing float glass, including a tank having walls of refractory material, a bath of molten metal in said tank, and a solid casing outside of said walls but provided with an opening the improvement which comprises a chamber connected to a vacuum source and secured to said casing in surrounding relation to said opening, and a wall of porous material between said chamber and said refractory wall and closing said opening in the solid casing.

2. Apparatus as defined in claim 1 in which said wall of porous material fills said opening.

3. Apparatus as defined in claim 1 in which said wall of porous material covers said opening.

4. Apparatus as defined in claim 1 in which means is provided for cooling said chamber.

5. In apparatus for producing float glass, a tank having walls of refractory material, a bath of molten metal in said tank and a solid casing outside of said walls but having an opening therein, a suction device positioned in surrounding relation to said opening, said device comprising a chamber connected to a vacuum source and being closed on its side facing the opening in said casing by a wall of porous material, and means for securing said suction device to said casing.

6. Apparatus as defined in claim 5 in which a plurality of openings arranged in a pattern are provided in said casing, and means is provided for securing and sealing said chamber to the casing in surrounding relation to said pattern.

7. Apparatus as defined in claim 5 which includes cooling means associated with said chamber and similar to the chamber in outline form.

References Cited

UNITED STATES PATENTS

| 3,334,983 | 8/1967 | Badger et al. | 65—182 |
| 3,355,093 | 11/1967 | Bancroft | 230—101 |

FOREIGN PATENTS 619,722  3/1949  Great Britain.

DONALL H. SYLVESTER, *Primary Examiner.*

R. V. FISHER, *Assistant Examiner.*

U.S. Cl. X.R.

65—65, 99